(12) United States Patent
Sakamoto et al.

(10) Patent No.: US 6,357,885 B2
(45) Date of Patent: Mar. 19, 2002

(54) MIRROR SURFACE ANGLE ADJUSTING DEVICE

(75) Inventors: Masato Sakamoto; Morihiko Ogasawara, both of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/808,058

(22) Filed: Mar. 15, 2001

(30) Foreign Application Priority Data

Mar. 21, 2000 (JP) .................................... 2000-078091

(51) Int. Cl.[7] .............................................. G02B 7/182
(52) U.S. Cl. ...................... 359/877; 359/871; 359/872
(58) Field of Search ................................. 359/877, 871, 359/872; 248/474, 476; 307/10.1

(56) References Cited

U.S. PATENT DOCUMENTS 5,724,200 A    3/1998  Mochizuki
5,896,238 A  * 4/1999  Hübscher et al. ............ 359/877
6,213,612 B1 * 4/2001  Schnell et al. ............... 359/877

FOREIGN PATENT DOCUMENTS

JP        8-192680        7/1996

* cited by examiner

*Primary Examiner*—Mohammad Sikder
(74) *Attorney, Agent, or Firm*—Nixon Peabody LLP; Thomas W. Cole

(57) ABSTRACT

In a mirror surface angle adjusting device of the present invention, supplying terminals of a connector is inserted into insertion holes of a case thereby electric power is supplied to a motor within the case. Thus the motor is driven to adjust the mirror surface angle of the mirror body. A closing plate of the connector substantially closes the interior of first waterproofing walls provided on a periphery of the insertion holes. A second water proofing wall is provided at the connector. In this way, it is possible to suppress entering of water into the first waterproofing walls.

14 Claims, 9 Drawing Sheets

MIRROR SURFACE ANGLE ADJUSTING DEVICE

BACKGROUND OF THE INVENTION

1. Field of the Invention

The present invention relates to a mirror surface angle adjusting device which adjusts a mirror surface angle of a mirror body for rearward vehicle vision.

2. Description of the Related Art

Some mirror bodies for rearward vehicle vision are provided with a mirror surface angle adjusting device. The mirror surface angle adjusting device has, for example, a case. The case is disposed at the back surface side of the mirror body. A retaining portion is provided at the mirror body side of the case. An inner mirror holder is swingably held by the retaining portion. The inner mirror holder is fixed to the back surface side of the mirror body. In this way, the mirror body is swingably held at its center of gravity by the retaining portion.

The case is provided with a pair of rods. The terminal ends of respective rods are inserted into the case. The rods are movable in the vehicle longitudinal direction. The inner mirror holder is rotatably held by the distal ends of the rods. Due to the rods moving in the vehicle longitudinal direction, the mirror body can swing about the retaining portion.

A pair of motors are provided within the case so as to correspond to the pair of rods. The rods are moved in the vehicle longitudinal direction due to the driving of the motors. As a result, the mirror body swings about the retaining portion such that the mirror surface angle of the mirror body is adjusted.

Each motor is provided with a pair of receiving terminals. The motors can receive electric power from the receiving terminals. A pair of insertion holes are formed in the case so as to correspond to the pair of receiving terminals. A pair of supplying terminals of a connector are inserted from the insertion holes and are connected to the receiving terminals. Electric power is supplied from the supplying terminals via the receiving terminals to the motors so as to drive the motors as described above.

A waterproofing member such as a grommet or the like is mounted to the connector. Due to the waterproofing member, water is prevented from entering from each insertion hole into the case and thus into each motor.

In such a mirror surface angle adjusting device, however, a waterproofing member such as a grommet or the like is needed. There has been the problem that, as the waterproofing member is a separate component from the connector, the number of components and the number of assembling steps are increased, resulting in high costs.

SUMMARY OF THE INVENTION

In view of the aforementioned, an object of the present invention is to provide a mirror surface adjusting device which can prevent water from entering into a motor and which can accomplish this prevention of water from entering into the motor at a low cost.

A mirror surface angle adjusting device pertaining to a first aspect of the present invention includes a mirror body having a back surface side and a case provided at the mirror back surface side, a retaining portion provided in the case for swingably supporting the mirror body, a plurality of motors and a plurality of swinging members, the motors being operable when supplied with electric power for driving the swinging members to swing the mirror body relative to the retaining portion to adjust a mirror surface angle, the mirror surface angle adjusting device includes (a) a plurality of receiving terminals provided at the motors in order for the motors to receive electric power; (b) a plurality of insertion holes formed at the case so as to correspond to the receiving terminals; (c) first waterproofing walls which are integrally provided at the case so as to correspond to the respective insertion holes and to surround the insertion holes and; (d) a connector fitted to the case, having a closing plate which is formed in a substantial plate shape and which substantially closes an interior of the first waterproofing walls and a plurality of supplying terminals integrally provided at the closing plate, inserted into the insertion holes to connect the supplying terminals to the receiving terminals for supplying electric power to the motors, and; (e) a second waterproofing wall integrally provided at one of the connector and the case so as to extend along each of the first waterproofing walls, and in which a gap between the first waterproofing wall and the second waterproofing wall becomes large as approaching the insertion hole.

According to the mirror surface angle adjusting device of the present invention, the retaining portion of the case swingably holds the mirror body. A plurality of motors as a swinging device are provided within the case. Electric power is supplied to the motors so as to drive the motors thereby the mirror body swings about the retaining portion to adjust the mirror surface angle.

The connector which is fitted into the case has a plurality of supplying terminals. The supplying terminals are inserted into the insertion holes formed at the case and connected to the receiving terminals. Electric power is supplied to the motors as described above to drive the motors.

The case is integrally provided with the first waterproofing walls around the respective insertion holes. The interior of the first waterproofing walls are substantially closed by the closing plate which is integrally provided at the connector. Thus it is possible to suppress entering of water into the first waterproofing walls and into the respective insertion holes. The second waterproofing wall is integrally provided at the connector or the case so as to extend along each of the first waterproofing walls. Accordingly, water must go over the second waterproofing wall in addition to the first waterproofing wall in order to enter into the insertion holes. Entering of water into the insertion hole is further suppressed. The gap between the first waterproofing wall and the second waterproofing wall becomes larger as approaching the insertion hole. Therefore water which enters into the gap between the first waterproofing wall and the second waterproofing wall serves as a waterproofing wall caused by the surface tension. As a result, it is possible to prevent water from approaching the insertion holes, so as to prevent water from entering from the insertion holes into the case and then into the motors.

In accordance with the mirror surface angle adjusting device of the present invention, the second waterproofing wall is preferably provided at the connector. The distal end of the first waterproofing wall opposes the terminal end of the second waterproofing wall. The second waterproofing wall is provided in the vicinity of the periphery portion of the closing plate so as to protrude toward the case.

The second waterproofing wall is provided at the connector and the distal end of the first waterproofing wall opposes the terminal end of the second waterproofing wall. The path where water goes over the first waterproofing walls and over the second waterproofing wall and enters into the insertion holes of the case is formed like a labyrinth and is long.

Therefore, it is possible to further prevent water from entering from the insertion holes into the case and then into the motors.

The mirror surface angle adjusting device according to the present invention, preferably includes a third waterproofing wall which is integrally provided at one of the connector and the case so as to extend along one of the first waterproofing wall and the second waterproofing wall, and whose distal end opposes a terminal end of one of the first waterproofing wall and the second waterproofing wall. Here, the second waterproofing wall preferably surrounds the first waterproofing walls in a substantially arcuate shape and is positioned so as to extend partially along the first waterproofing walls. Further, the first waterproofing wall has a plurality of first guide holes at a vehicle upward side and at a vehicle downward side relative to the insertion hole. Moreover, the third waterproofing wall has a plurality of second guide holes at a vehicle upward side and at the vehicle downward side relative to the insertion hole.

The case is formed of a case portion at the mirror body side (lower case) and a case portion at the opposite side of the mirror body side (upper case). The inner mirror holder is fixed to the case portion at the mirror body side by the retaining portion. Fitting holes are formed at each gap between each of the first waterproofing walls and the third waterproofing wall on a line connecting a pair of insertion holes. The connector which is fitted into the case preferably has a pair of fitting pawls which protrude toward the case in order to be fitted into the case. Further, the connector has a pair of convex portions to prevent water from entering into the third waterproofing wall. The supplying terminals are integrally formed at the connector so as to protrude toward the case.

The third waterproofing wall is integrally provided at one of the connector and the case so as to extend along one of the first waterproofing wall and the second waterproofing wall. In order for water to enter into the insertion holes of the case, water must go over the third waterproofing wall as well as the first waterproofing wall and the second waterproofing wall. Thus entering of water into the insertion holes is further suppressed. The distal end of the third waterproofing wall opposes the terminal end of one of the first waterproofing wall and the second waterproofing wall. The path where water goes over one of the first waterproofing walls and over the second waterproofing wall and the third waterproofing wall and enters into one of the insertion holes is formed like a labyrinth and is long. As a result, it is possible to further prevent water from entering from the insertion holes into the case and then into the motors.

As described above, the first waterproofing walls are integrally provided at the case and the second waterproofing wall is integrally provided at the connector or the case. Thereby it is possible to reduce the number of components and the number of assembling steps. Further, a conventional waterproofing member such as a grommet or the like is not necessary resulting in cost reduction. Moreover, the third waterproofing wall is integrally provided at the connector or the case, thus the number of components and the number of assembling steps can be further reduced. Even if the third waterproofing wall is provided, cost reduction can be accomplished.

A connector pertaining to another aspect of the present invention includes (a) a closing plate; (b) supply terminals protruding from the closing plate; (c) wires extending from the supply terminals for connection to an electrical power source; (d) a second waterproofing wall protruding from the closing plate extending around the supply terminals, the second waterproofing wall having a passage through which the wires extend to the supply terminals; (e) fitting pawls extending from the second waterproofing wall for connection to the mirror surface angle adjusting device; and (f) convex portions protruding from the closing plate.

In accordance with the connector of the present invention, the second waterproofing wall preferably extends between the convex portions and the supplying terminals.

Because the second waterproofing wall and the fitting pawls are integrally formed at the connector, the ability of waterproofing can be improved and the number of components and the number of assembling steps can be reduced.

DESCRIPTION OF THE PREFERRED EMBODIMENT

An embodiment of the present invention will be described hereinafter with reference to the drawings.

Figure 6:
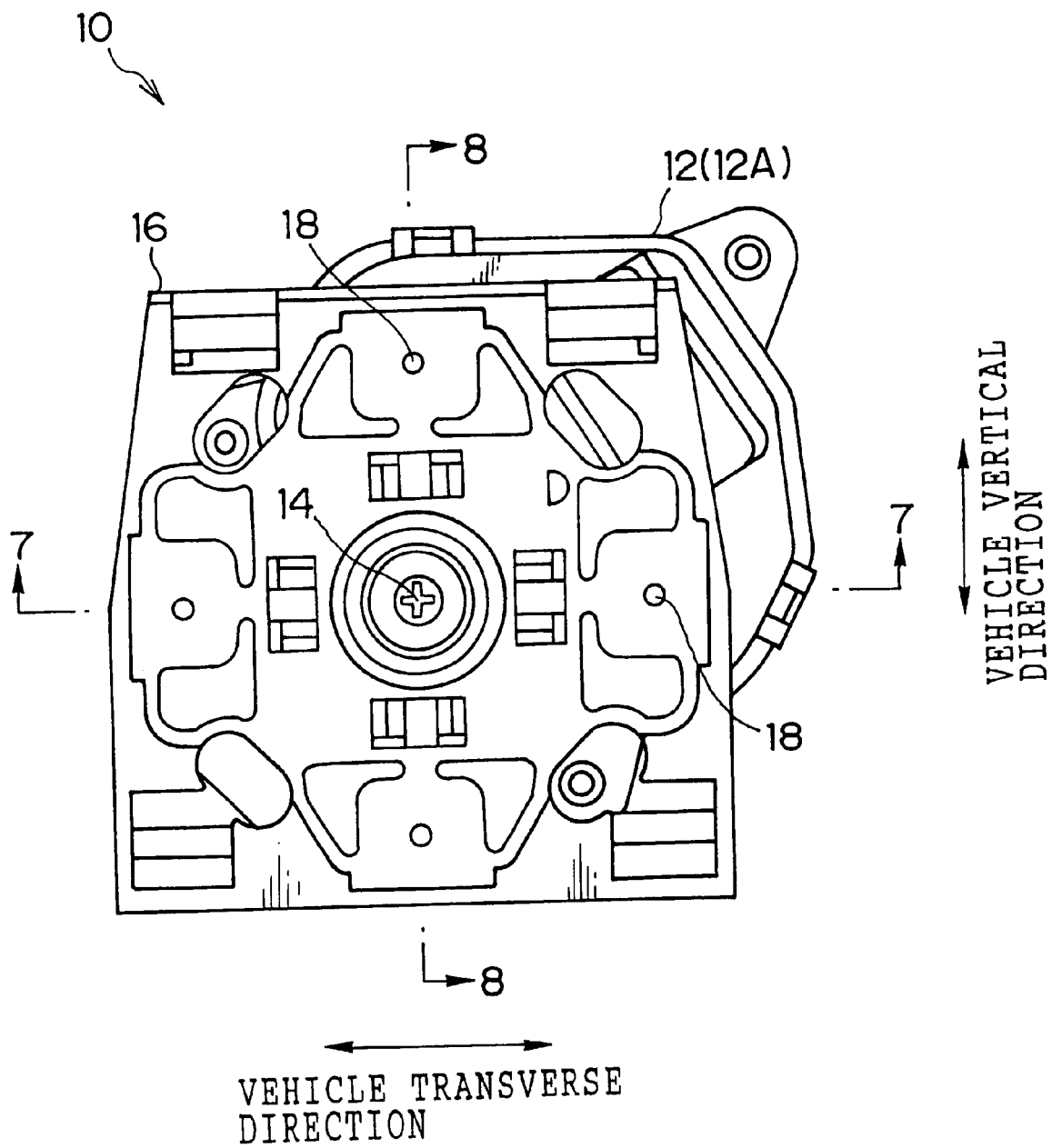
FIG. 6 is a front view of the mirror surface angle adjusting device relating to the embodiment of the present invention.
Figure 7:
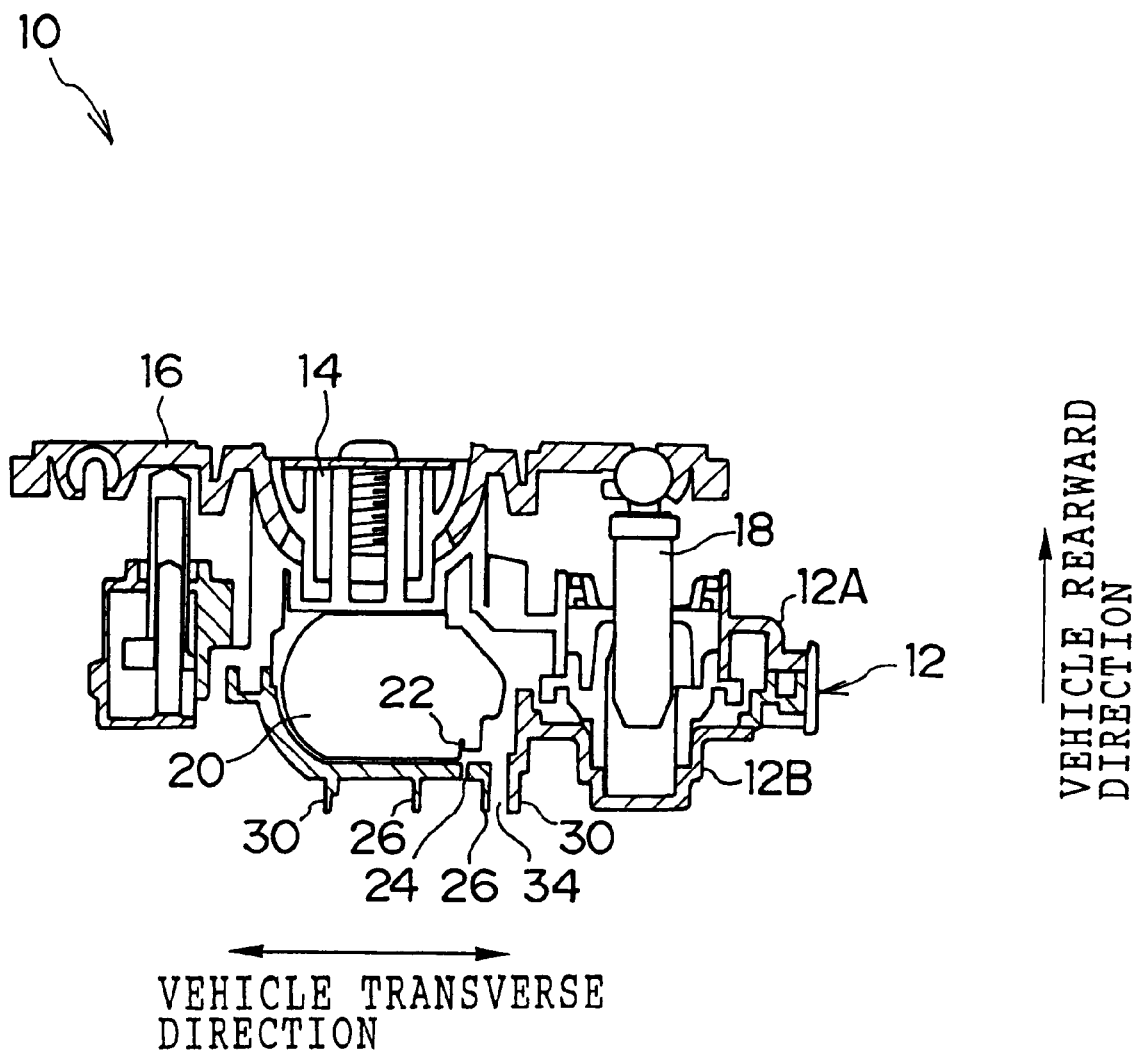
FIG. 7 is a cross-sectional view, taken along line 7—7 in FIG. 6, of the mirror surface angle adjusting device relating to the embodiment of the present invention.
Figure 8:
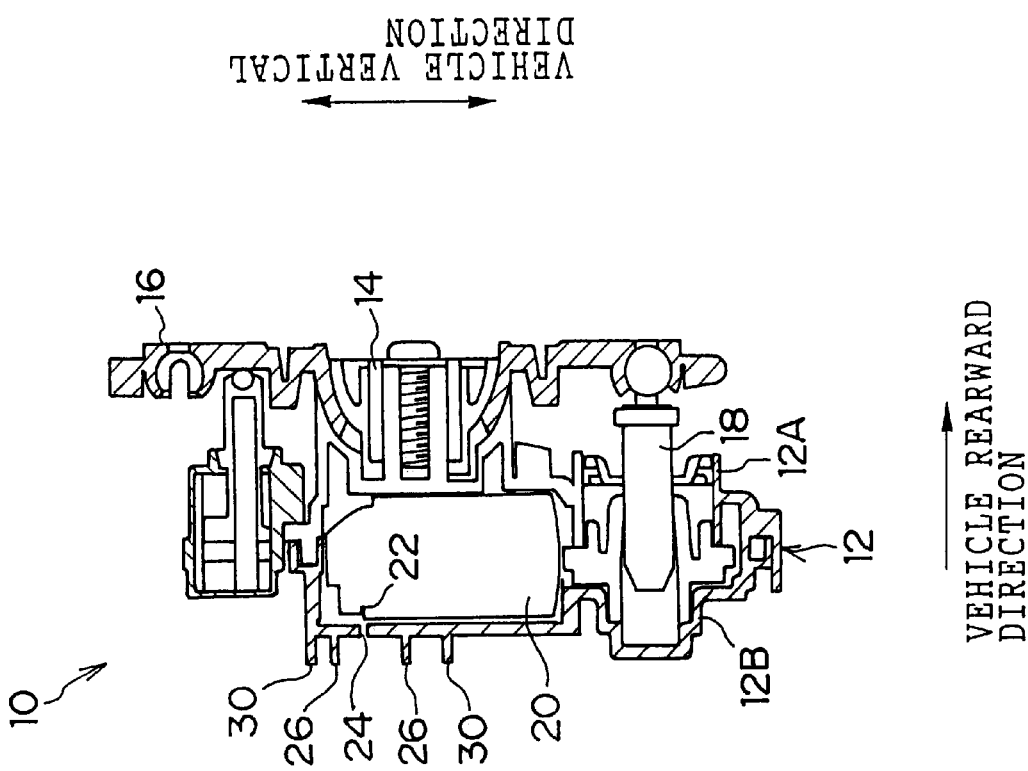
FIG. 8 is a cross-sectional view, taken along a line 8—8 in FIG. 6, of the mirror surface angle adjusting device relating to the embodiment of the present invention.
Figure 9:
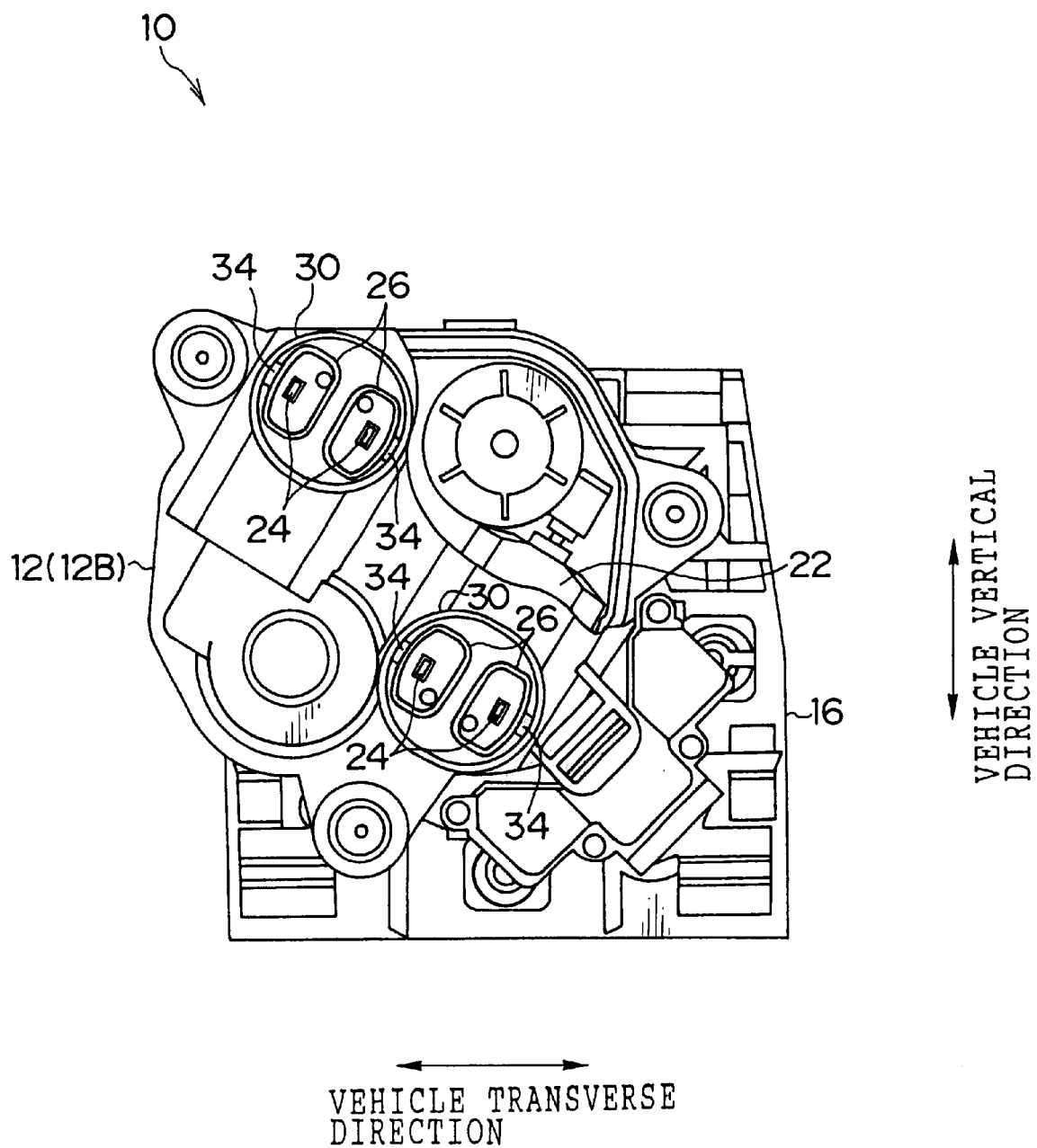
FIG. 9 is a partially broken rear view of the mirror surface angle adjusting device relating to the embodiment of the present invention.

FIG. 6 is a front view of a mirror surface angle adjusting device 10 relating to an embodiment of the present invention. FIG. 7 is a cross-sectional view taken along line 7—7 shown in FIG. 6. FIG. 8 is a cross-sectional view taken along line 8—8 shown in FIG. 6. FIG. 9 is a partially-broken rear view of the mirror surface angle adjusting device 10.

The mirror surface angle adjusting device 10 relating to the present embodiment includes a case 12. The case 12 is disposed at the back surface side (the vehicle front side) of a mirror body (not shown) for rearward vehicle vision. The case 12 is formed of a lower case 12A at the mirror body side thereof and an upper case 12B at the opposite side of the mirror body side thereof. A retaining portion 14 is provided at the mirror body side of the case 12 (i.e., at the lower case 12A). An inner mirror holder 16 is swingably held by the retaining portion 14. The inner mirror holder 16 is fixed to the back surface side of the mirror body. Thus, the mirror body is swingably held at its center of gravity by the retaining portion 14.

A pair of rods 18 are provided at the mirror body side of the case 12 (at the lower case 12A) to enable swinging of the mirror body. The terminal ends of the rods 18 are inserted in the case 12. The rods 18 are movable in the vehicle longitudinal direction. One of the rods 18 is disposed above the retaining portion 14 (i.e., higher, in the vehicle heightwise direction, than the retaining portion 14). The other rod 18 is disposed at the right-hand side of the retaining portion 14 (i.e., toward the right, in the transverse direction of the vehicle, of the retaining portion 14). The inner mirror holder 16 is rotatably held at respective distal ends of the rods 18. Accordingly, if the rods 18 are moved in the vehicle longitudinal direction, the mirror body swings about the retaining portion 14. In the present embodiment, the rods 18 are respectively disposed above and to the right of the retaining portion 14 as described above. However, the rods 18 may be respectively disposed lower than and to the left of the retaining portion 14 as long as they enable swinging of the mirror body.

A pair of motors 20 for enabling swinging of the rods 18 are provided within the case 12 so as to correspond to a pair of the rods 18. Each motor 20 is provided with a pair of receiving terminals 22. Each receiving terminal 22 is formed in a substantially cylindrical shape. The motor 20 can receive electric power via the pair of receiving terminals 22. When electric current is supplied via the receiving terminals 22 to the motor 20, the motor 20 is driven such that the rod 18 is moved in the vehicle longitudinal direction. Thus, the mirror body swings about the retaining portion 14 as described above so as to adjust the mirror surface angle of the mirror body.

Figure 1:
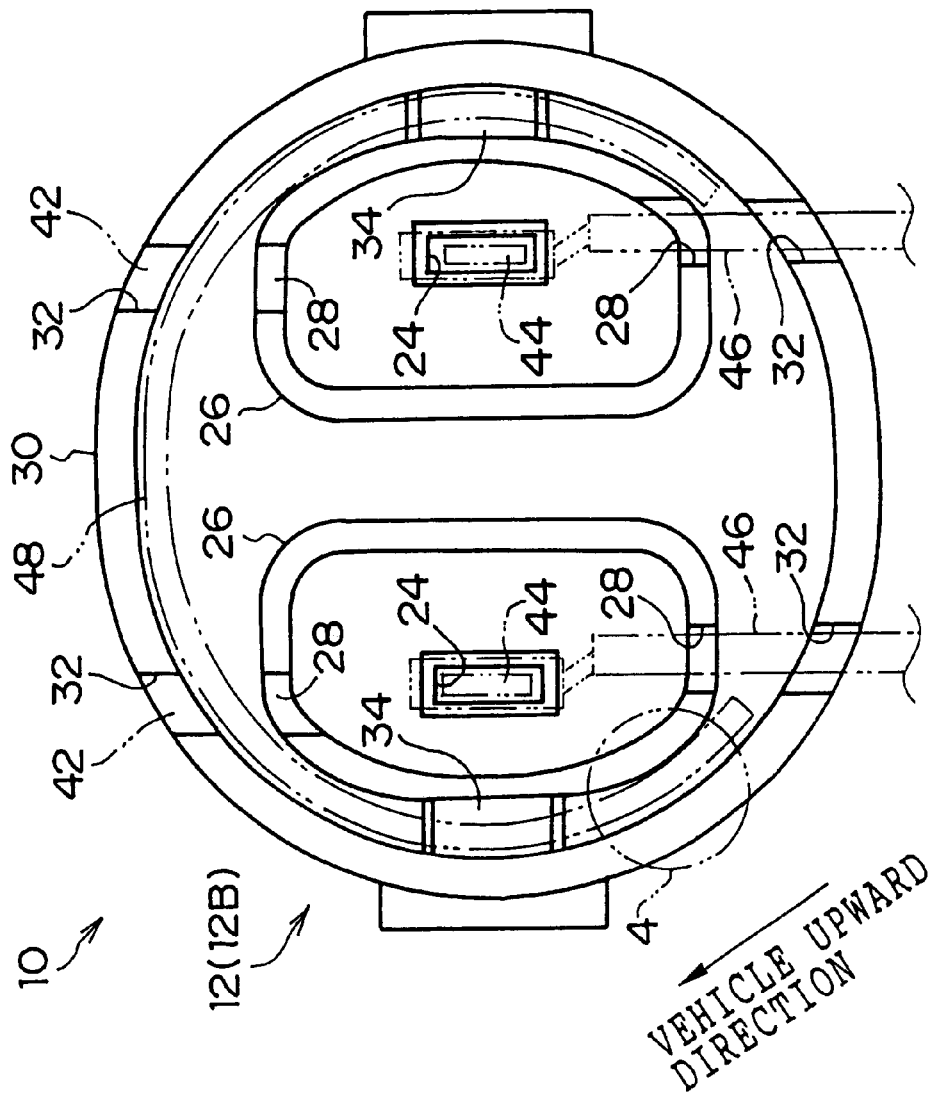
FIG. 1 is a rear view of main portions (first and third waterproofing walls) of a mirror surface angle adjusting device relating to an embodiment of the present invention.
Figure 2:
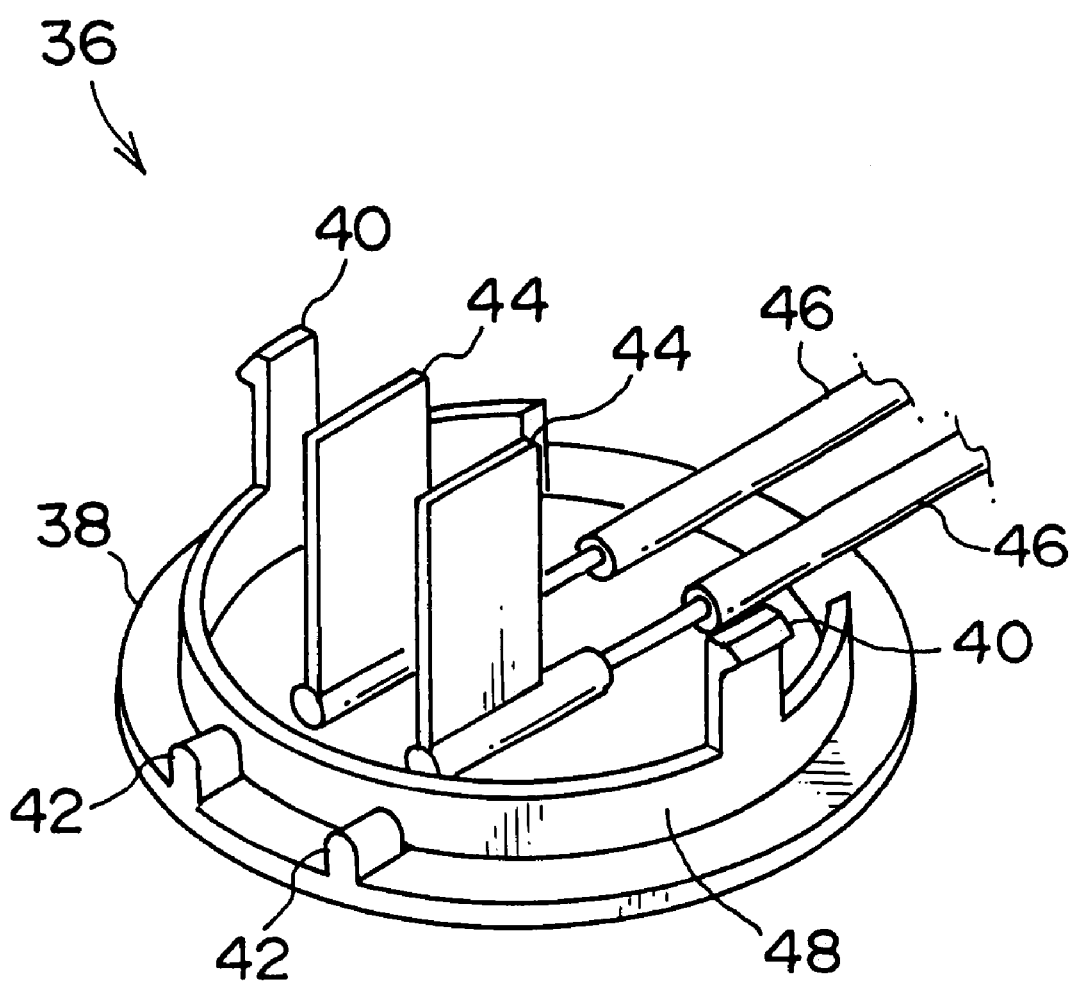
FIG. 2 is a perspective view of a connector of the mirror surface angle adjusting device relating to the embodiment of the present invention.
Figure 3:
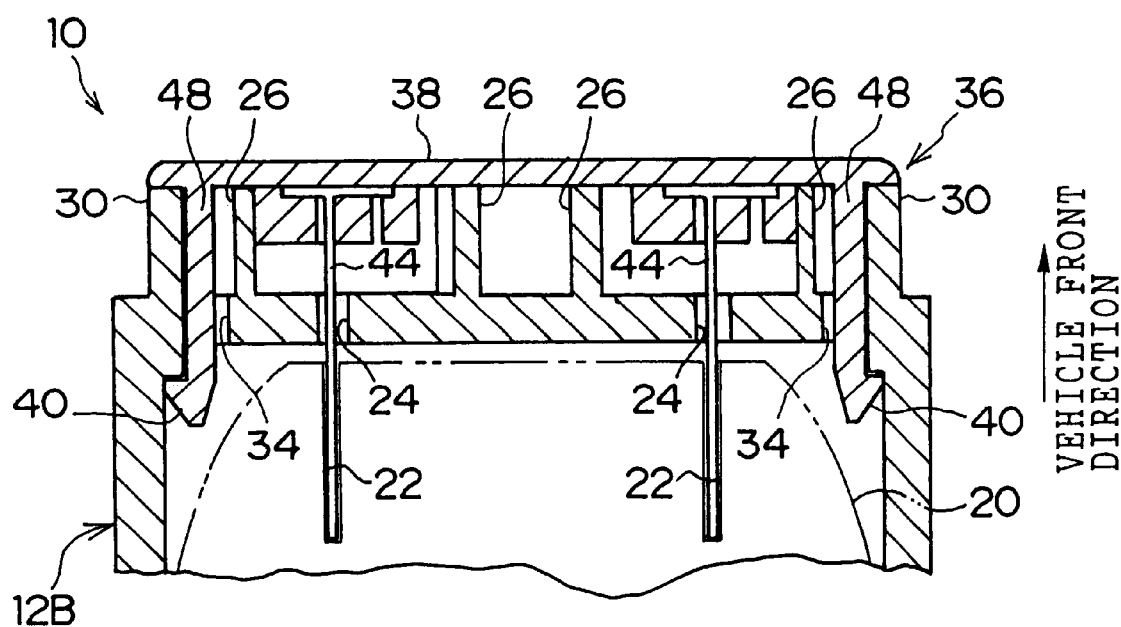
FIG. 3 is a cross-sectional view of main portions of the mirror surface angle adjusting device relating to the embodiment of the present invention.

As shown in FIG. 1 and in FIG. 9, four insertion holes 24 (a pair of insertion holes 24 for each motor 20) are formed at the opposite side of the mirror body side of the case 12 (i.e., at the upper case 12B) so as to correspond to the receiving terminals 22. Four first waterproofing walls 26 (a pair of first waterproofing walls 26 for each motor 20) are formed integrally with the opposite side of the mirror body side of the case 12 (i.e., at the upper case 12B) so as to correspond to the insertion holes 24. Each of the first waterproofing walls 26 are disposed around the respective insertion holes 24 so as to surround the insertion holes 24 in a substantial elliptical shape with its center substantially being the respective insertion holes 24. Two first guide holes 28 are formed at the ends of each first waterproofing wall 26. One guide hole 28 is formed at the upward side, in the vehicle heightwise direction, of the insertion hole 24 and the other guide hole 28 is formed at the downward side, in the vehicle heightwise direction, of the insertion hole 24. Further, a pair of third waterproofing walls 30 (one waterproofing wall 30 for each motor 20) are formed integrally with the opposite side of the mirror body side of the case 12 (i.e., at the upper case 12B). Each third waterproofing wall 30 is disposed around the first waterproofing wall 26 pair so as to surround the insertion hole 24 pair in a substantially circular shape. Four second guide holes 32 are formed at ends of each third waterproofing wall 30. Two of the guide holes 32 are formed at the upward side, in the vehicle heightwise direction, of the insertion hole 24 pair, and the other two of the guide holes 32 are formed at the downward side, in the vehicle heightwise direction, of the insertion hole 24 pair. Four fitting holes 34 (a pair of fitting holes 34 for each motor 20) are formed in the side of the case 12 opposite the mirror body side thereof (i.e., in the upper case 12B). Each fitting hole 34 is disposed in each gap between the first waterproofing wall 26 and the third waterproofing wall 30 on a line connecting the pair of insertion holes 24.

As shown in FIGS. 2 through 5 in detail, a pair of connectors 36 (one connector 36 for each motor 20) are provided at the opposite side of the mirror body side of the case 12 (i.e., at the upper case 12B) so as to correspond to a pair of the third waterproofing walls 30. Each connector 36 has a closing plate 38 which is formed in a substantial disc-shape. The closing plate 38 is provided with a pair of fitting pawls 40 which protrude toward the case 12. The fitting pawl 40 pair corresponds to the above-described fitting hole 34 pair. By the fitting pawls 40 fitting into the corresponding fitting holes 34, the connector 36 is fitted together with the case 12. The closing plate 38 abuts ends of the third waterproofing wall 30 and substantially abuts ends of the first waterproofing walls 26. (Here, "ends" refers to the ends which are directed upward in the cross-sectional view shown in FIG. 3.) Thus, an interior of the third waterproofing wall 30 and interiors of the first waterproofing walls 26 are substantially closed by the closing plate 38. A pair of convex portions 42 are provided on a periphery of the closing plate 38. The convex portions 42 are fitted into the upper set of second guide holes 32 so that water is prevented from entering into the third waterproofing wall 30 from above.

A pair of supplying terminals 44 are integrally provided at the closing plate 38 so as to protrude toward the case 12. By inserting the supplying terminals 44 into the above-described insertion holes 24, the supplying terminals 44 are inserted into the receiving terminals 22 and connected thereto. Wires 46 are connected to the supplying terminals 44. Each wire 46 is inserted into the first guide hole 28 and the second guide hole 32 located downwardly of the insertion holes 24. Thus, the wires 46 are guided from the downward side of the third waterproofing wall 30 to outside of the third waterproofing wall 30. Further, the wires 46 are connected to a power supply (not shown). Electric power is supplied from the power supply via the wires 46 and the supplying terminals 44 to the receiving terminals 22. As a result, as described above, electric power is supplied to the motors 20 so as to drive the same. Gaps are formed between the first guide hole 28 and the wire 46 and between the second guide hole 32 and the wire 46.

Figure 4:
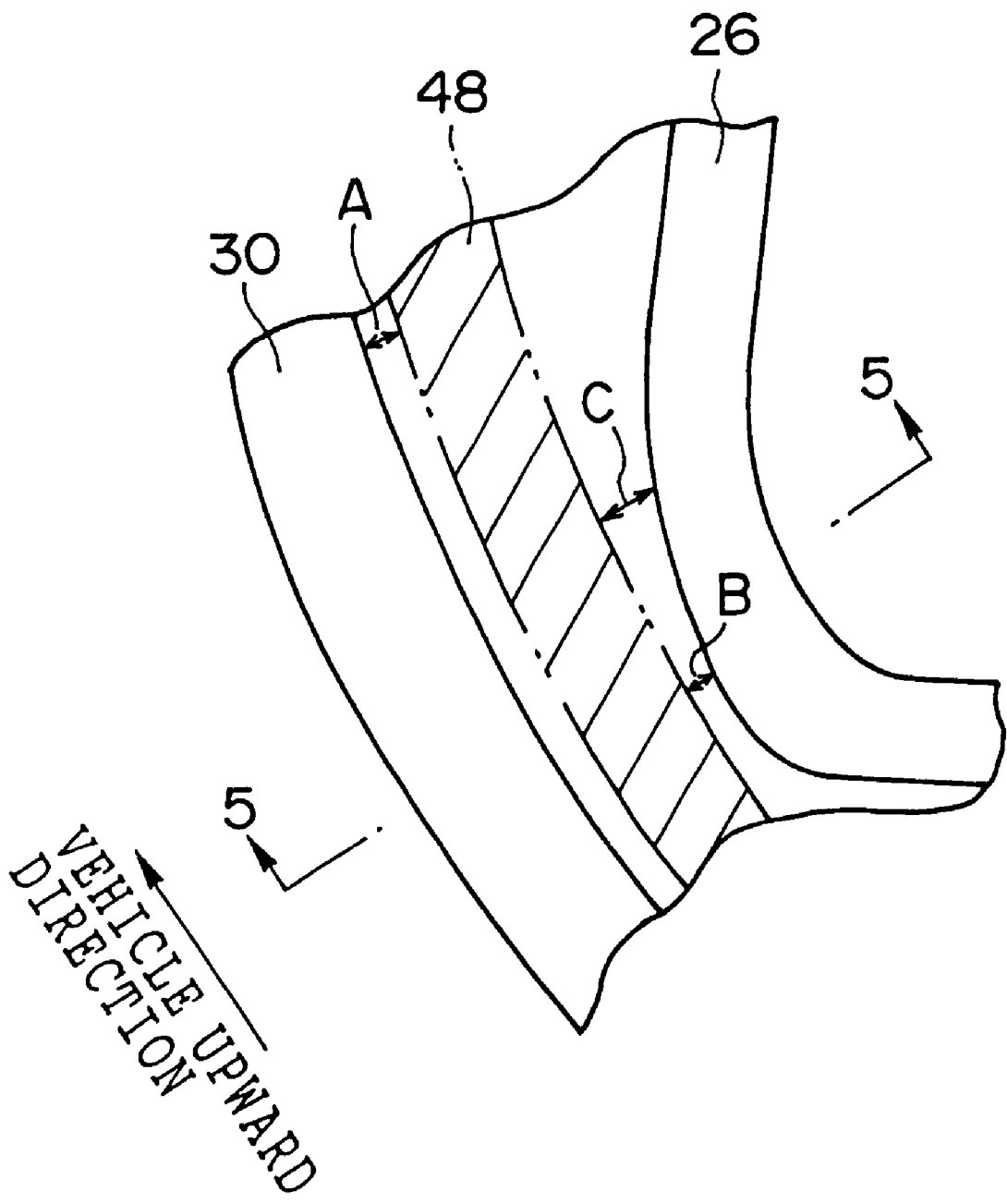
FIG. 4 is a rear view of main portions of the mirror surface angle adjusting device relating to the embodiment of the present invention (i.e., is a detailed view of area 4 in FIG. 1).

A second waterproofing wall 48 is integrally provided in the vicinity of the periphery of the closing plate 38 so as to protrude toward the case 12. The second waterproofing wall 48 is disposed at the inner side of the third waterproofing wall 30 and so as to always run along the third waterproofing wall 30. (In the present embodiment, for example, the gap between the second waterproofing wall 48 and the third waterproofing wall 30 (i.e., the width A shown in FIG. 4) is always a constant 0.1 mm.) The second waterproofing wall 48 surrounds the first waterproofing wall 26 pair in a substantially arcuate shape and is disposed partially along the first waterproofing walls 26. The gaps between each first waterproofing wall 26 and the second waterproofing wall 48 becomes larger as the waterproofing wall 48 approaches the insertion holes 24. (In the present embodiment, for example, the width B shown in FIG. 4 is 0.1 mm and the width C shown in FIG. 4 is 0.25 mm.) The distal end of the second waterproofing wall 48 substantially abuts the wall surface of the case 12. The terminal end of the second waterproofing wall 48 opposes the distal end of the first waterproofing wall 26 and the distal end of the third waterproofing wall 30. (The "distal end" and the "terminal end" refer to the distal end and the terminal end in the cross-sectional view shown in FIG. 3.)

Operation of the present embodiment will be explained hereinafter.

In the mirror surface adjusting device 10 with the above-described structure, the retaining portion 14 of the case 12 swingably holds the mirror body (not shown) at a center of gravity of the mirror body. The mirror body is rotatably held by respective distal ends of the rods 18 provided at the case 12. The pair of motors 20 are provided within the case 12. Electric power is supplied to the respective motors 20 so as to drive. The rods 18 are moved in the vehicle longitudinal direction. The mirror body thereby swings about the retaining portion 14 such that the mirror surface angle of the mirror body is adjusted.

The connector 36 which is fitted into the case 12 has the supplying terminals 44. The supplying terminals 44 are inserted into the insertion holes 24 formed in the case 12 so as to be connected to the receiving terminals 22 formed at the motors 20. Further, the supplying terminals 44 are connected via the wires 46 to a power supply (not shown). Electric power is supplied from the power supply via the wires 46 and the supplying terminals 44 to the receiving terminals 22. In this way, as described above, electric power is supplied to the motors 20 so as to drive the motors 20.

Here, the first waterproofing walls 26 are integrally provided at the case 12 so as to surround the insertion holes 24. The interiors of the first waterproofing walls 26 are substantially closed by the closing plate 38 which is integrally formed at the connector 36. Thus it is possible to suppress entering of water into the first waterproofing walls 26 and the insertion holes 24. The second waterproofing wall 48 is integrally provided at the connector 36 so as to extend along the first waterproofing walls 26. Therefore, water must go over the second waterproofing wall 48 in addition to the first waterproofing walls 26 in order to enter into the insertion holes 24. Thus it is able to further suppress entering of water into the insertion holes 24 (within the first waterproofing walls 26). The gaps between each first waterproofing wall 26 and the second waterproofing wall 48 becomes larger as approaching the insertion holes 24. Thus it is possible to prevent water which enters from the vehicle downward side via the gaps between the second guide holes 32 and the wires 46 into the gaps between the first waterproofing walls 26 and the second waterproofing wall 48 from approaching the insertion holes 24 (moving toward the vehicle upward side) by the surface tension. Accordingly, it is possible to prevent water from entering from the insertion holes 24 into the case 12 and then into the motors 20.

Figure 5:
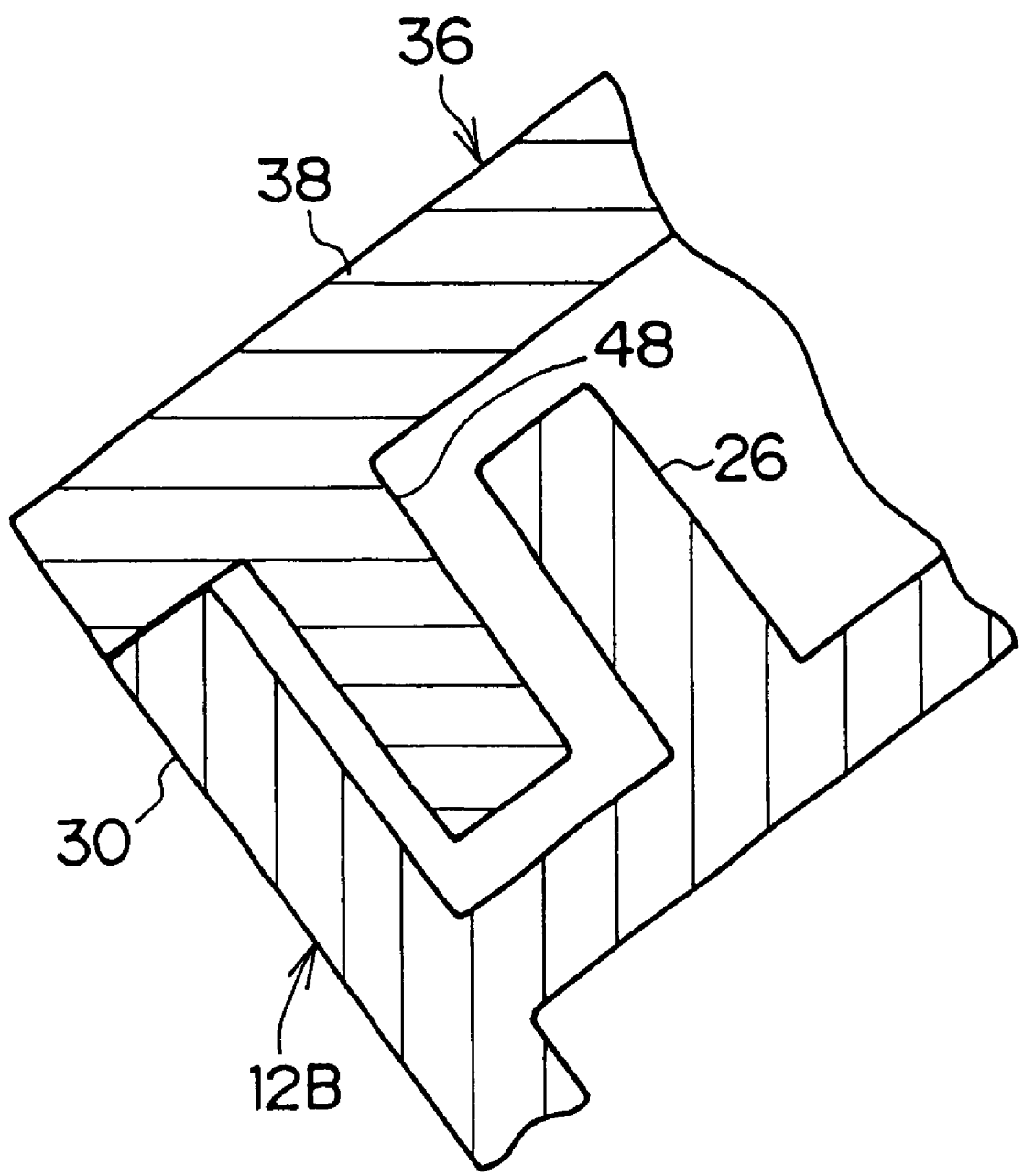
FIG. 5 is a cross-sectional view, taken along line 5—5 in FIG. 4, of main portions of the mirror surface angle adjusting device relating to the embodiment of the present invention.

The distal ends of the first waterproofing walls 26 oppose the terminal end of the second waterproofing wall 48, thus a path where water goes over each of the first waterproofing walls 26 and the second waterproofing wall 48 and enters into the insertion holes 24 is formed like a labyrinth and is long (see FIG. 5). As a result, it is possible to further prevent water from entering from the insertion holes 24 into the case 12 and then into the motors 20.

Further, the third waterproofing wall 30 is integrally provided at the case 12 so as to extend along the second waterproofing wall 48. Thus in order for water to enter into the insertion holes 24, water must go over the third waterproofing wall 30 as well as the first waterproofing walls 26 and the second waterproofing wall 48. Accordingly, it is possible to further suppress entering of water into the insertion holes 24 (the interior of the first waterproofing walls 26). The distal end of the third waterproofing wall 30 opposes the terminal end of the second waterproofing wall 48. The path where water goes over the second waterproofing wall 48 and the third waterproofing wall 30 and enters into the insertion holes 24 is formed like a labyrinth and is long (see FIG. 5). As a result, it is possible to further prevent water from entering from the insertion holes 24 into the case 12 and then into the motors 20.

As described above, it is possible to prevent water which enters into the gaps between each first waterproofing wall 26 and the second waterproofing wall 48 from moving toward the vehicle upward side by the surface tension. It is possible to prevent water which enters into the gaps between each first waterproofing wall 26 and the second waterproofing wall 48 from approaching the fitting holes 34 by the surface tension. Accordingly, it is also possible to prevent water which enters into the gap between the second waterproofing wall 48 and the third waterproofing wall 30 from moving toward the vehicle upward side (approaching the fitting holes 34) by the surface tension. It is possible to prevent water from entering from the fitting holes 34 into the case 12 and then into the motors 20.

As described above, it is possible to prevent water which enters into the gaps between the first waterproofing walls 26 and the second waterproofing wall 48 from moving toward the vehicle upward side by the surface tension. Accordingly, it is possible to suppress or prevent entering of water via the gaps between the first guide holes 28 of the first waterproofing walls 26 (the first guide holes 28 at the vehicle downward side of the insertion holes 24) and the wires 46 into the interior of the first waterproofing walls 26. Even if water enters via the gaps into the first waterproofing walls 26, water cannot reach the insertion holes 24 positioned at the vehicle upward side. Thus, it is possible to prevent water from entering via the gaps between the first guide holes 28 and the wires 46 into the insertion holes 24. It is possible to perfectly prevent water from entering from the insertion holes 24 into the case 12 and then into the motors 20.

As described above, by integrally providing the first waterproofing walls 26 at the case 12 and integrally providing the second waterproofing wall 48 at the connector 36, it is possible to reduce a number of components and a number of assembling steps. A conventional waterproofing member such as a grommet or the like becomes unnecessary resulting in cost reduction.

As described above, as the third waterproofing wall 30 is integrally formed at the case 12, it is possible to further reduce the number of components and the number of assembling steps. As a result, even if the third waterproofing wall 30 is provided, cost reduction can be accomplished.

In the present embodiment, although the second waterproofing wall 48 is integrally provided at the connector 36, the second waterproofing wall 48 may be integrally provided at the case 12.

In the present embodiment, the third waterproofing wall 30 is integrally provided at the case 12 so as to extend along the second waterproofing wall 48. The third waterproofing wall 30 may be integrally provided at the connector 36 or the case 12 so as to extend along the first waterproofing walls 26. The third waterproofing wall 30 may be integrally provided at the connector 36 so as to extend along the second waterproofing wall 48.

What is claimed is:

1. A mirror surface angle adjusting device for use on a vehicle for rearward vehicle vision, the mirror surface angle adjusting device comprising a mirror body having a back surface side and a case provided at the mirror back surface side, a retaining portion provided in the case for swingably supporting said mirror body, a plurality of motors and a plurality of swinging members, the motors being operable when supplied with electric power for driving said swinging members to swing said mirror body relative to said retaining portion to adjust a mirror surface angle comprising:

(a) a plurality of receiving terminals provided at said motors in order for said motors to receive electric power;

(b) a plurality of insertion holes formed at said case so as to correspond to said receiving terminals;

(c) first waterproofing walls which are integrally provided at said case so as to correspond to said respective insertion holes and to surround said insertion holes and;

(d) a connector fitted to said case, having a closing plate which is formed in a substantial plate shape and which substantially closes an interior of said first waterproofing walls and a plurality of supplying terminals integrally provided at said closing plate, inserted into said insertion holes to connect said supplying terminals to said receiving terminals for supplying electric power to said motors, and;

(e) a second waterproofing wall integrally provided at one of said connector and said case so as to extend along each of said first waterproofing walls, and in which a gap between said first waterproofing wall and said second waterproofing wall becomes large as approaching said insertion hole.

2. The mirror surface angle adjusting device according to claim 1, wherein said second waterproofing wall is integrally provided at said connector such that a distal end of said first waterproofing wall opposes a terminal end of said second waterproofing wall.

3. The mirror surface angle adjusting device according to claim 1 further comprising a third waterproofing wall which is integrally provided at one of said connector and said case so as to extend along one of said first waterproofing wall and said second waterproofing wall, and whose terminal end opposes a distal end of one of said first waterproofing wall and said second waterproofing wall.

4. The mirror surface angle adjusting device according to claim 2 further comprising a third waterproofing wall which is integrally provided at one of said connector and said case so as to extend along one of said first waterproofing wall and said second waterproofing wall, and whose distal end opposes a terminal end of one of said first waterproofing wall and said second waterproofing wall.

5. The mirror surface angle adjusting device according to claim 1, wherein said case is formed of a lower case at the mirror body side for rearward vehicle vision and an upper case at the opposite side of the mirror body side.

6. The mirror surface angle adjusting device according to claim 1, wherein said case is provided with an inner mirror holder which is fixed to the case portion at the mirror body side by said retaining portion so as to be positioned at the back surface side of the mirror body.

7. The mirror surface angle adjusting device according to claim 3, wherein said first waterproofing wall has a plurality of first guide holes at a vehicle upward side and at a vehicle downward side relative to the insertion hole.

8. The mirror surface angle adjusting device according to claim 3, wherein said third waterproofing wall has a plurality of second guide holes at a vehicle upward side and at the vehicle downward side relative to the insertion hole.

9. The mirror surface angle adjusting device according to claim 3, wherein said case includes fitting holes which are positioned at a gap between said first waterproofing walls and said third waterproofing wall along a line connecting the insertion holes.

10. The mirror surface angle adjusting device according to claim 3, wherein said connector has a pair of fitting pawls which protrude toward said case.

11. The mirror surface angle adjusting device according to claim 3, wherein said connector has a pair of convex portions.

12. The mirror surface angle adjusting device according to claim 3, wherein a plurality of supplying terminals are integrally provided at said connector so as to protrude toward said case.

13. The mirror surface angle adjusting device according to claim 3, wherein said second waterproofing wall surrounds said first waterproofing walls in a substantially arcuate shape and is positioned so as to extend partially along said first waterproofing walls.

14. The mirror surface angle adjusting device according to claim 4, wherein said second waterproofing wall is provided in the vicinity of a periphery of said closing plate so as to protrude toward said case side.

* * * * *